(12) United States Patent
Podoloff et al.

(10) Patent No.: US 11,852,561 B2
(45) Date of Patent: Dec. 26, 2023

(54) PORTABLE TIRE CONTACT SENSORS

(71) Applicant: Tekscan, Inc., South Boston, MA (US)

(72) Inventors: Robert M. Podoloff, Framingham, MA (US); Camilo Aladro, Newton, MA (US); Michael Harty, Winthrop, MA (US); Christopher George, Lynn, MA (US); Arnon Ofaim, Watertown, MA (US); Gary Loomis, Leominster, MA (US); Gabor Papp, Lexington, MA (US)

(73) Assignee: Tekscan, Inc., Norwood, MA (US)

( * ) Notice: Subject to any disclaimer, the term of this patent is extended or adjusted under 35 U.S.C. 154(b) by 0 days.

(21) Appl. No.: 17/733,059

(22) Filed: Apr. 29, 2022

(65) Prior Publication Data

US 2022/0349782 A1    Nov. 3, 2022

Related U.S. Application Data

(60) Provisional application No. 63/182,024, filed on Apr. 30, 2021.

(51) Int. Cl.
| | | |
|---|---|---|
| *G01M 17/02* | (2006.01) | |
| *G01L 1/18* | (2006.01) | |
| *B60C 25/00* | (2006.01) | |
| *G01L 1/14* | (2006.01) | |
| *G01L 1/20* | (2006.01) | |

(52) U.S. Cl.
CPC ......... *G01M 17/022* (2013.01); *B60C 25/007* (2013.01); *G01L 1/146* (2013.01); *G01L 1/18* (2013.01); *G01L 1/205* (2013.01)

(58) Field of Classification Search
CPC .. G01L 17/005; G01M 17/024; G01M 17/022
See application file for complete search history.

(56) References Cited

U.S. PATENT DOCUMENTS

| | | | | |
|---|---|---|---|---|
| 3,478,582 | A * | 11/1969 | Hough | .............. G01L 17/005 73/146.2 |
| 3,878,712 | A * | 4/1975 | Chapin | .............. G01L 17/005 73/146 |
| 4,630,470 | A * | 12/1986 | Brooke | .............. G01L 17/005 73/146.2 |
| 5,086,652 | A | 2/1992 | Kropp | |
| 5,641,900 | A | 6/1997 | Di Bernardo et al. | |
| 6,094,979 | A * | 8/2000 | Haslett | .............. G01L 17/005 73/146 |

(Continued)

OTHER PUBLICATIONS

International Search Report and Written Opinion in International Application No. PCT/US2022/026950, dated Jul. 25, 2022.

*Primary Examiner* — Tran M. Tran
(74) *Attorney, Agent, or Firm* — Wolf, Greenfield & Sacks, P.C.

(57) ABSTRACT

Embodiments disclosed herein relate to a thin, light, and portable system for measuring one or more parameters of a contact patch between a tire and a surface. The system may be configured with an array of sensors capable of being removable fixed to the surface. The array of sensors may measure the one or more parameters of the contact patch between the tire and the surface. Moreover, the system may include a scanner configured to interpret the measurements from the array of sensors as data and store the data.

24 Claims, 6 Drawing Sheets

(56) References Cited

U.S. PATENT DOCUMENTS

| | | | | |
|---|---|---|---|---|
| 6,157,877 | A * | 12/2000 | Jones | G01R 31/367 73/114.61 |
| 6,272,936 | B1 * | 8/2001 | Oreper | A63B 60/06 73/862.621 |
| 6,573,828 | B2 * | 6/2003 | Wu | G01L 17/005 73/146.2 |
| 7,222,522 | B2 * | 5/2007 | Monguzzi | G01L 17/005 73/146 |
| 7,421,890 | B2 * | 9/2008 | Imanishi | G01M 17/022 701/72 |
| 7,523,656 | B1 | 4/2009 | Blixhavn et al. | |
| 7,942,048 | B2 * | 5/2011 | Pingel | G01L 17/005 73/146.5 |
| 8,065,911 | B2 * | 11/2011 | Taylor | G01L 17/005 73/146 |
| 8,381,601 | B2 * | 2/2013 | Stumpf | G01D 15/00 73/777 |
| 8,806,931 | B2 * | 8/2014 | Cuttino | G01M 17/02 73/146 |
| 8,935,042 | B2 * | 1/2015 | Taylor | G01L 1/146 702/50 |
| 9,038,449 | B2 * | 5/2015 | Cuttino | G01M 17/021 73/146 |
| 9,372,131 | B2 * | 6/2016 | Martin | G01L 9/0052 |
| 9,921,134 | B2 * | 3/2018 | Unterreiner | G01M 17/022 |
| 10,048,171 | B2 * | 8/2018 | Kuwayama | G01M 17/022 |
| 10,247,640 | B2 * | 4/2019 | Mawby | B29D 30/0633 |
| 10,377,194 | B2 * | 8/2019 | Wei | G06F 30/20 |
| 10,460,226 | B2 * | 10/2019 | Wei | B60C 11/24 |
| 10,492,734 | B2 * | 12/2019 | Ferber | A61B 5/1114 |
| 10,591,376 | B2 * | 3/2020 | Ledoux | G01L 1/18 |
| 10,684,161 | B2 * | 6/2020 | Masago | B60C 23/04 |
| 10,942,078 | B2 * | 3/2021 | Pingel | G01L 17/005 |
| 11,562,601 | B2 * | 1/2023 | Ledoux | B60C 23/20 |
| 2006/0123897 | A1 | 6/2006 | Monguzzi et al. | |
| 2007/0018803 | A1 * | 1/2007 | Lang | G01L 17/005 340/442 |
| 2007/0235231 | A1 * | 10/2007 | Loomis | G01L 1/205 178/18.06 |
| 2008/0289407 | A1 | 11/2008 | Gramling et al. | |
| 2009/0000370 | A1 * | 1/2009 | Lionetti | G01B 11/22 73/146 |
| 2010/0139383 | A1 * | 6/2010 | Haswell | G01M 17/02 73/146 |
| 2014/0316645 | A1 | 10/2014 | Rose et al. | |
| 2015/0249198 | A1 | 9/2015 | Weston et al. | |
| 2016/0061681 | A1 * | 3/2016 | Jang | G01M 17/02 73/146.2 |
| 2016/0153763 | A1 * | 6/2016 | Ledoux | G01M 17/02 73/146 |
| 2016/0169657 | A1 * | 6/2016 | Ledoux | G01M 17/02 73/146 |
| 2016/0332493 | A1 | 11/2016 | Atsumi et al. | |
| 2017/0246915 | A1 | 8/2017 | Besnoin et al. | |
| 2018/0009271 | A1 * | 1/2018 | Ledoux | G01M 17/02 |
| 2019/0232734 | A1 * | 8/2019 | Koike | G01M 17/022 |
| 2022/0080779 | A1 | 3/2022 | Fudo et al. | |
| 2022/0185037 | A1 * | 6/2022 | Collin | G07C 5/008 |

* cited by examiner

PORTABLE TIRE CONTACT SENSORS

CROSS-REFERENCE TO RELATED APPLICATIONS

This application claims the benefit under 35 U.S.C. § 119(e) to U.S. Provisional Ser. No. 63/182,024, entitled "CONTACT SENSORS" filed on Apr. 30, 2021, which is incorporated herein by reference in its entirety.

FIELD

Disclosed embodiments relate to contact sensors, for example, sensors configured to sense a contact patch between a tire and a real or simulated road.

BACKGROUND

The size, shape, and pressure distribution of a contact patch between a tire of a vehicle and a surface is a function not only of the load, speed, and direction of the vehicle, but also of the design of the tread pattern and the materials used in the tire itself. Because of the influence of the contact patch on the ultimate performance of the vehicle, tire manufacturers may employ methods to observe and measure the contact patch in both actual (e.g., on road) and simulated test conditions.

Generally speaking, a tire manufacturer may employ one or more known methods of collecting data related to the contact patch of a tire. For example, conventional methods include simple solutions such as rolling ink onto the tire surface and rolling the inked tire on a sheet of paper. Other conventional methods include simulating a road surface using a cast iron drum or taking a picture of the contact patch using a camera system mounted to a transparent plate.

BRIEF SUMMARY

According to one aspect, a lightweight, portable system for measuring the size, shape and vertical pressure profile of a contact area occurring between a moving tire and a real or simulated road surface includes a thin, flexible array of force or pressure sensing elements and a means for scanning the array of sensing elements to determine a contact force or pressure on a surface of the array at a time. The system further includes a means for storing data associated with the contact force or pressure on the surface of the array at the time, a means for collecting the stored data for analysis on an external computing device, and a means for wirelessly transferring the stored data to the external computing device.

According to another aspect, a portable tire contact measurement system device configured to process data associated with one or more parameters of a contact area between a moving tire and a real or simulated road surface includes a 1×N array of sensors arranged on a thin, flat, flexible strip of material and configured to be mounted to the real or simulated road surface, wherein N is an integer greater than 1 and wherein the array is configured to sense one or more parameters of the contact area between the moving tire and the real or simulated road surface. A scanner supported by the strip of material is configured to receive and store the data associated with the one or more parameters of the contact area between the moving tire and the real or simulated road surface sensed by the array.

According to yet another aspect, a force sensing array sensor for measuring a dynamic tire contact patch includes a thin and flexible mylar strip configured to be mounted to a real or simulated flat road surface and a 1×128 array of piezo-resistive sensors mounted to the strip. The array sensor may further include a housing mounted to the mylar strip and scanning and recording electronics housed in the housing and communicating with the sensors, wherein the scanning electronics are configured to scan the sensors at a rate of approximately 20,000 Hz and wherein the recording electronics are configured to store data scanned by the scanning electronics.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Figure 1A:
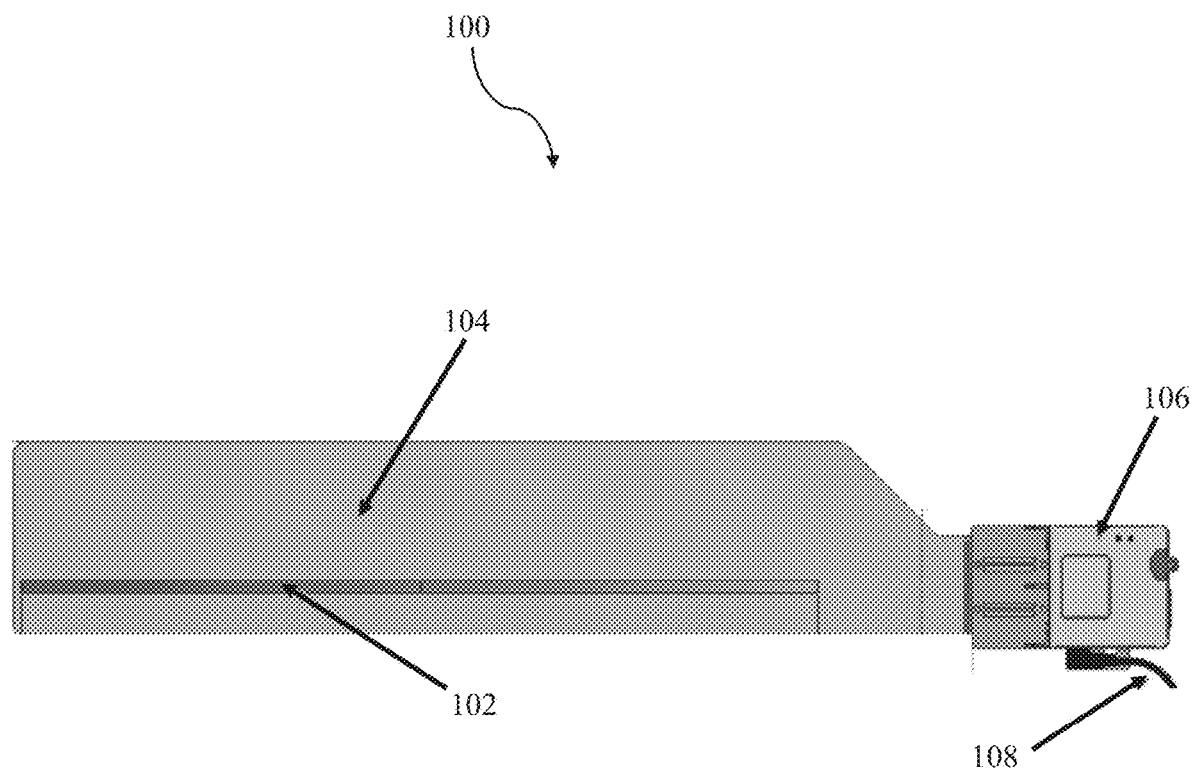
FIG. 1A is a top view of a portable tire contact measurement system according to one illustrative embodiment.

The contact patch of a tire is literally the place where "the rubber meets the road" in terms of transferring the angular momentum of an engine and/or drivetrain into the linear momentum of a moving vehicle. As such, parameters associated with the contact patch (e.g., load, speed, direction, tread pattern, material properties, etc.), which may dynamically change, is of prime interest to tire manufacturers, suspension designers, racing car drivers, and many others involved in the design and production of a vast array of vehicles and/or tires of different types, shapes, and sizes. Thus, it may be desirable for tire manufacturers, suspension designers, racing car drivers and/or others to employ a means of collecting data associated with a contact patch between a tire and a real or simulated road surface.

Generally speaking, conventional systems for measuring parameters associated with a contact patch may include simple solutions such as rolling ink onto the tire surface and rolling the inked tire of a sheet of paper. Alternatively or additionally, more complex methods may be employed such as mounting a tire to an apparatus having a cast iron drum or taking a picture of the contact patch using a camera system mounted to a transparent plate. However, the simple methods, such as rolling ink on the tire may result in inaccurate or incomplete data, while the more complex methods may require heavy and large test rigs to collect the desired data. Additionally, such systems are not modular, preventing the conventional systems from being capable of being adapted as the needs of a user may change. In view of the above, the inventor has recognized the advantages of a contact sensor system capable of being sized such that the contact sensor system is portable and compatible with multiple potential testing conditions (e.g., a true road surface, a belt, a drum, etc.).

Alternatively or additionally, conventional systems for measuring parameters associated with a contact patch of a tire may be capable of measuring the parameters of the contact patch at a fixed polling rate (e.g., the number of times per second that the system collects data regarding the contact patch). Typically, this rate may range between 200 Hz and 500 Hz. However, the inventor has found that a higher polling rate may allow a user to collect data with greater accuracy, as may be needed in some applications. In view of the above, the inventor has recognized the advantages of a contact sensor system capable of polling data at a rate of approximately 20,000 Hz.

Accordingly, in some embodiments, a contact sensor system according to the present disclosure includes features that allow the contact sensor system to be portable and/or collect data at a polling rate of approximately 20,000 Hz.

In some embodiments, a portable tire contact measurement system is configured to collect and process data associated with one or more parameters of a tire contact patch (e.g., between a real or simulated road surface and a tire). The one or more parameters may include one or more of a size of the contact patch, shape of the contact patch, a vertical pressure profile of the tire relative to the contact patch, or any other suitable parameter. The one or more parameters may be sensed by an array of sensors of the portable tire contact measurement system. In some embodiments, the array of sensors is configured as a 1×N array, meaning that the array of sensors consists of a series of sensors located adjacent to (or spaced apart from) one another in a line (which may be straight) or other suitable configuration. The array of sensors may be removably attachable to the test surface (e.g., a real or simulated road surface, the tire, a belt, a drum, etc.) such that when a tire moves along the test surface the tire makes contact with the 1×N array of sensors. Thus, the 1×N array of sensors may sense one or more parameters of the tire contact patch.

The 1×N array of sensors may measure the one or more parameters in any suitable manner. For example, in some instances, the array may consist of a thin, flexible piezoresistive sensors. Of course, the array of sensors may consist of other suitable sensors (e.g., optical, photosensitive, inductive, infrared, capacitive, sensors made of pressure resistive materials, etc.), depending on the application. In the 1×N array of sensors, N is any integer greater than 1 and less than a value suitable (and/or practical) to extend across a width of tire to be measured. In one embodiment, as will be described below, N is 128.

The array of sensors may be in electrical communication with a scanner configured to scan the measurements outputted from the sensors. The scanner may comprise a set of data collection electronics. For example, in some embodiments, the scanner includes a set of scanning electronics (e.g., data collection electronics) and/or a set of recording electronics. The scanning electronics may serve to collect data from the array of sensors as the array of sensors measures the one or more parameters associated with the contact path. In turn, the scanning electronics may than translate the measurements from the sensors into discrete data points. The recording electronics may then read and store the data in any appropriate type of memory (e.g., NAND flash memory, a hard drive, a micro-SD card, random access memory, non-volatile memory, etc.).

In some embodiments, the scanner may poll data from the array of sensors at any suitable rate. Particularly, the scanner may poll data at a rate that is less than or equal to 35,000 Hz, 30,000 Hz, 25,000 Hz, and/or another appropriate polling rate. Correspondingly, the scanner may poll data at a rate greater than or equal to 5,000 Hz, 10,000 Hz, 15,000 Hz, and/or another appropriate polling rate. Combinations of the above-noted ranges are contemplated, including, but not limited to, polling rates between 5000 Hz and 35,000 Hz, between 10,000 Hz and 30,000 Hz, and between 15,000 Hz and 25,000 Hz. In some embodiments, the polling rate is approximately 20,000 Hz. Of course, any suitable polling rate may be employed, depending on the application.

Alternatively or additionally, the scanner may also include communications electronics that enable the scanner to transfer the data to another device, such as an external analysis device, external memory storage, or any other suitable external device. The communication electronics may transfer the data either through a wired connection (e.g., a universal serial bus connection, etc.) or through a wireless connection (e.g., Bluetooth, Wi-Fi, etc.). In some embodiments, the communication electronics may also serve to allow external control of the tire contact measurement system, such as enabling a signal to trigger the collection of data and/or terminate the collection of data.

Alternatively or additionally, the scanner may include a manner of controlling the scanning electronics, the recording electronics, and/or the communication electronics on board the scanner. For example, the scanner may include a processor configured to operate the various electronic modules of the scanner. The processor may be configured to direct the scanning electronics to retrieve data from the array of sensors (e.g., as described above). Moreover, the processor may be configured to direct the recording electronics to store the data (e.g., as described above). Further, the processor may be configured to direct the transmitter to send the data and/or execute commands received from an external control device (e.g., as described above). In some embodiments, the processor is configured to analyze the data on board the scanner (e.g., by using the data to form a digital image of the contact patch). The processor may be capable of storing the analysis on the memory of the scanner or on external memory (e.g., by employing the methods described above). Of course, the processor may be configured to control the scanner in any suitable manner, depending on the application. Examples of suitable scanners and/or scanning circuitry include those described in the Applicant's U.S. Pat. Nos. 5,505,072, 5,756,904, and 7,591,165, each of which is hereby incorporated by reference.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A shows an illustrative embodiment of a portable tire contact measurement device 100 according to the present disclosure. Portable tire contact measurement device 100 may include an array of sensors 102 configured to measure one or more parameters associated with a contact area between a tire and a surface. In the illustrated embodiment, array of sensors 102 includes a total of 128 sensors, arranged in a single row, forming a 1×128 array. Moreover, portable tire contact measurement device 100 may include features that allow array of sensors 102 to be removably fixed onto a surface. For example, in the illustrated embodiment, array of sensors 102 are mounted on a mylar strip 104. Mylar strip 104 may include adhesive properties such that mylar strip 104 may be attached to a surface, thus transitively attaching array of sensors 102 to the surface. Mylar strip 104 may be flexible. Thus, mylar strip 104 may be easily applied to a surface, without having to modify the surface. Of course, materials other than mylar (e.g., other flexible materials) are also contemplated.

Alternatively or additionally, strip 104 may be formed of any suitable material, thermoplastic rubber, natural rubber, synthetic rubber such as those based on polyisoprene, polybutadiene, polyisobutylene, polyurethane, polychloroprene, polysiloxane, or copolymers or blends thereof. Other potentially suitable materials include those based on butyl rubber, styrene-butadiene rubber, styrene-butadiene-styrene rubber, styrene-isoprene-styrene rubber, polyvinyl ether, acrylic, silicon rubbers, or silicon adhesives, as well as combinations thereof.

In some instances, the strip may be formed from an adhesive material (e.g., as described herein). Accordingly, high temperature adhesive films may be used, including those commercially available, for example, 3M high temperature adhesive transfer tapes or DuPont polyimide tapes. Without wishing to be bound by theory, selection of a particular suitable strip material may depend on several factors, such as thermal stability, chemical compatibility with other components, as well as factors related to fabrication, such as ease of application or cost. In some embodiments, the adhesive material comprises a synthetic rubber that provides pressure sensitive adhesion, and can be blended with one or more of a silane, such as a thermosetting polycondensed silane, and/or a silane coupling agent. Without wishing to be bound by theory, the ratio of the rubber to silane may be varied depending on the application and may be selected depending on, among other factors, the adhesive strength required, and/or the stability at the desired operating temperatures. For example, in some embodiments, a higher relative amount of rubber may be used if a relatively greater adhesive strength is desirable, or a higher relative amount of silane may be used for higher operating temperature stability. In some embodiments, the adhesive material may be applied or used by utilizing techniques known in the art such as, but not limited to, screen printing or solid films deposition. As will be appreciated by one of skill in the art, other additives may be used in the adhesive material, including antifoaming agents, viscosity modifiers, pigments, processing aids, antioxidant compounds, antiozonant compounds, or other suitable additives (e.g., to modify or improve the processability or other properties of the adhesive material).

In some embodiments, the array of sensors may be positioned on the strip using techniques such as ultrasonic welding, crimping, riveting, or suitable mechanical fastening techniques. Of course any suitable manner of fixing the array of sensors to the strip may be employed, depending on the application.

In one embodiment, the sensors may be formed of pressure sensitive materials, such as pressure sensitive inks, applied to the substrate (e.g., the strip). Example(s) of such pressure sensitive inks and processes for printing the inks on the substrate are described in the Applicant's U.S. Pat. No. 7,785,704, which is hereby incorporated by reference. Examples of alternative suitable manufacturing methods and/or materials for forming the sensor include those described in the Applicant's U.S. Pat. Nos. 4,734,034, 4,856,993, 5,033,291, and 5,989,700, each of which is hereby incorporated by reference.

Relatedly, in the illustrated embodiment, array of sensors 102 is flexible, allowing for array of sensors 102 to be easily applied to a surface, without having to modify the surface. Array of sensors may be made from any suitable material, depending on the application.

In the illustrated embodiment, array of sensors 102 comprises 128 piezo-resistive sensors. However, this need not be the case, as array of sensors 102 may include any appropriate number and/or type of sensor.

In some embodiments, portable tire contact measurement device 100 is light enough to be easily removably fixed to a surface (e.g., a road, a drum, a belt, etc.) and/or transported. Particularly, in some embodiments, portable tire contact measurement device 100 may have a mass of less than or equal to 500 g, 450 g, 400 g, and/or another appropriate mass. Correspondingly, the portable tire contact measurement device 100 may have a mass of greater than or equal to 200 g, 250 g, 300 g, and/or another appropriate mass. Combinations of the above-noted ranges are contemplated, including, but not limited to, masses between 200 g and 500 g, between 250 g and 450 g, and between 300 g and 400 g. Of course, portable tire contact measurement device 100 may be configured with any suitable mass, depending on the application.

Figure 1B:
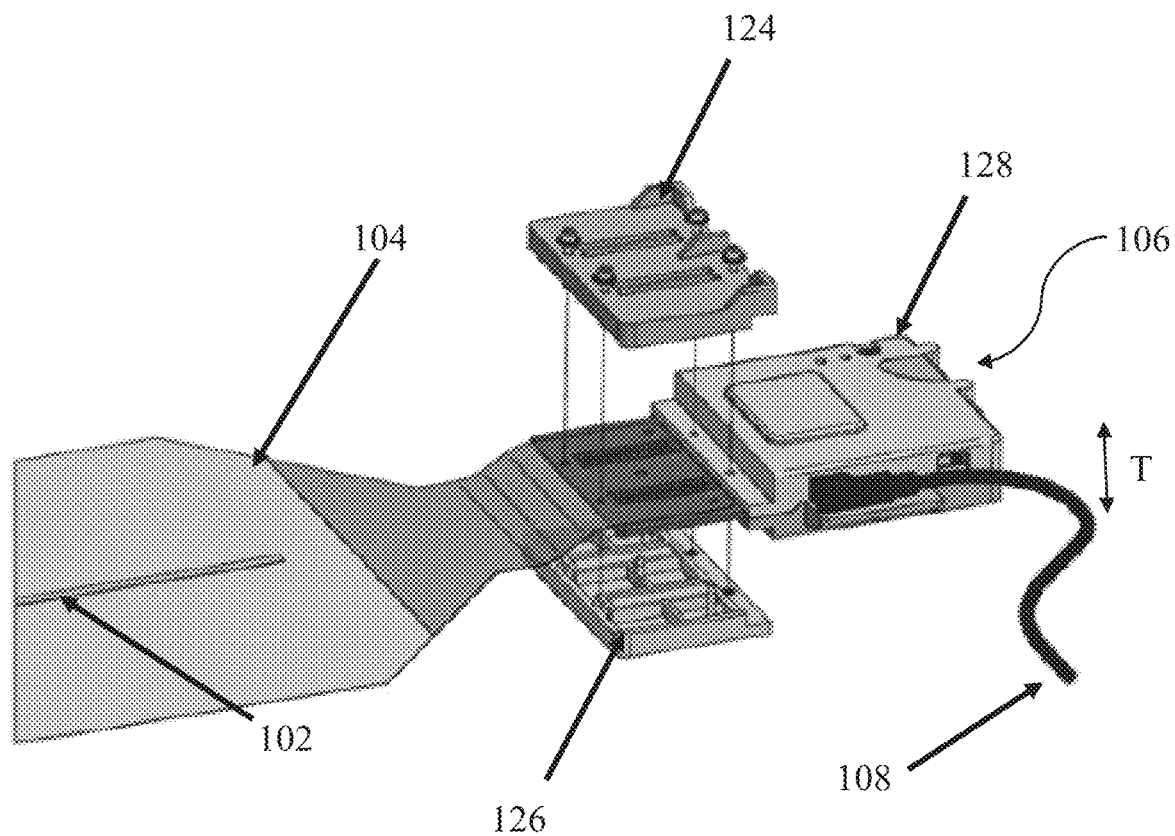
FIG. 1B is a perspective view of the portable tire contact measurement system according to the embodiment of FIG. 1A.

To collect and process data from array of sensors 102, portable tire contact measurement device 100 may include a scanner 106 in electrical communication with array of sensors 102. As explained in greater detail below (e.g., in reference to FIGS. 2A-2B), scanner 106 may be configured with features that allow scanner 106 to interpret the measurements of array of sensors 102 in the form of data and store the data. Scanner 106 may include a wired connection 108 (e.g., a USB connection) for programming, data transfer, or any other suitable operation. Moreover, scanner 106 may be capable of wirelessly communicating with one or more external devices. Scanner 106 may house electronics associated with scanner 106 in a housing 128, as illustrated in FIG. 1B.

Particularly, housing 128 may include features that allow housing 128 to attach to mylar strip 104 and/or array of sensors 102. For example, in the illustrated embodiment, housing 128 connects to mylar strip 104 and array of sensors 102 using a pair of opposing plates 124, 126. The pair of opposing plates 124, 126 may be configured to releasably attach to one another and contain at least a portion of mylar strip 104 when assembled. In the illustrated embodiment, the pair of opposing plates 124, 126 attach to one another using screw type fasteners, though is need not be the case as bolts, standoffs, rivets, adhesives, anchors, or any other suitable fastener may be employed, depending on the application.

In some embodiments, portable tire contact measurement device 100 is sized small enough to be easily transported. Particularly, in some embodiments, portable tire contact measurement device 100 may extend a maximum distance away from a surface when fixed to the surface, or alternatively a maximum thickness of the housing (e.g., thickness T, as depicted in FIG. 1B). The maximum distance or thickness may take on a value of less than or equal to 3 cm, 2.5 cm, 2 cm, and/or another appropriate distance. Correspondingly, the maximum distance or thickness may be greater than or equal to 0.5 cm, 1 cm, 1.5 cm, and/or another appropriate distance. Combinations of the above-noted ranges are contemplated, including, but not limited to, distances or thicknesses between 0.5 cm and 3 cm, between 1 cm and 2.5 cm, and between 1.5 cm and 2 cm. Of course, portable tire contact measurement device 100 may be configured with any suitable maximum distance or thickness, depending on the application.

Figure 2A:
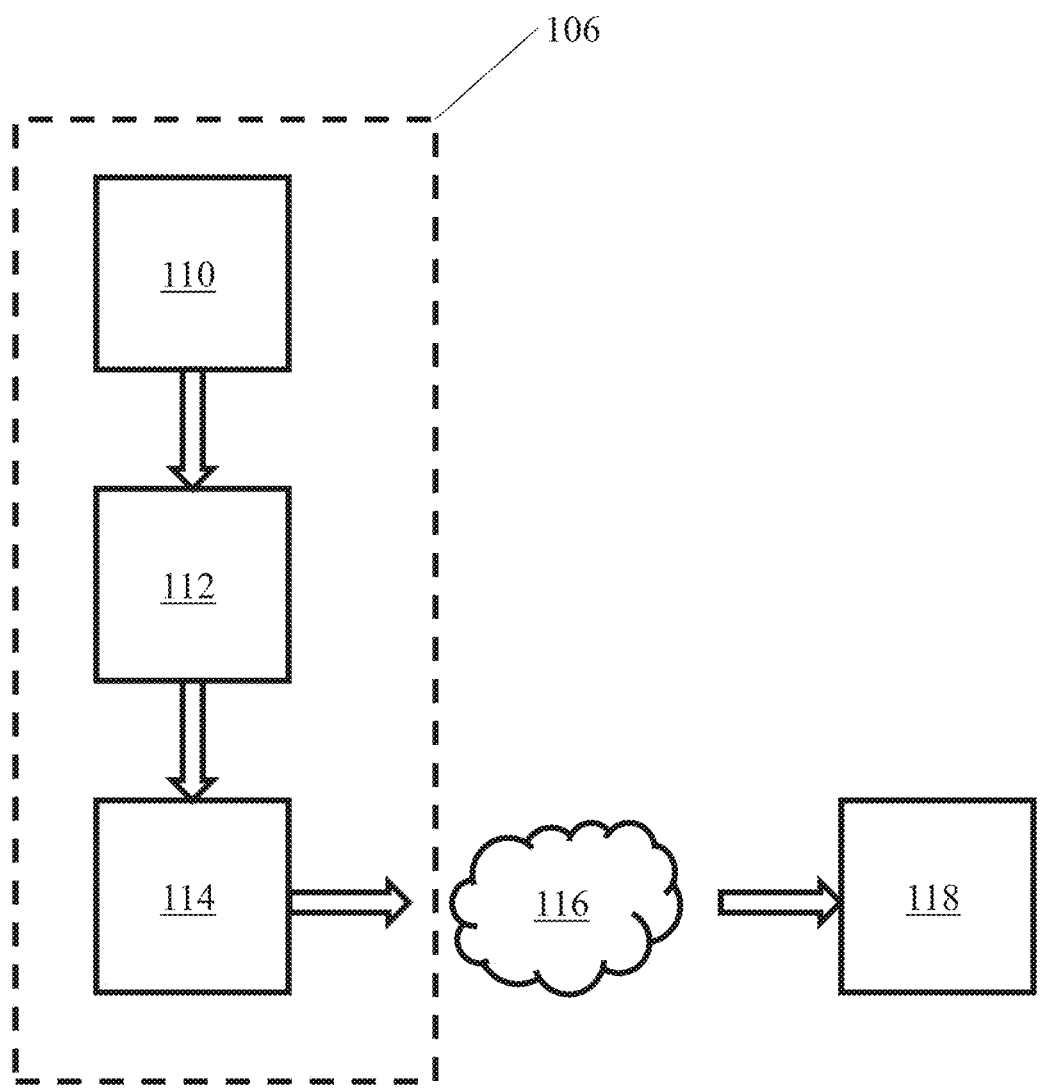
FIG. 2A is a schematic showing the flow of data of the portable tire contact measurement system according to the embodiment of FIGS. 1A-1B.

FIG. 2A is a flowchart depicting an exemplary flow of data within scanner 106 of portable tire contact measurement device 100. Scanner 106 may include scanning electronics 110 configured to scan array of sensors 102 and collect the measurements of array of sensors 102 as data. Particularly, scanning electronics 110 may scan array of sensors 102 at a specified polling rate (e.g., 20,000 Hz as described above) and transmit the resulting data to recording electronics 112. Recording electronics 112 may be configured to store the resulting data in a memory. Scanner 106 may further include communication electronics 114 configured to read the data from the memory and export the data in any appropriate fashion. For example, communication electronics 114 may export the data (via either wired or wireless connection) to a cloud server 116. Alternatively or additionally, communication electronics 114 may export the data to an analysis device 118, either wirelessly or by a wired connection (e.g., wired connection 108), which may be configured to analyze the data, for example, by processing the data into a graphical representation of the contact patch. Of course, scanner 106 may include alternative or additional electronics as appropriate, depending on the application.

The control logic described above may be executed by a processor or other suitable controller associated with or internal to scanner 106. In some embodiments, the processor may analyze the data (e.g., by processing the data into a graphical representation of the contact patch). Of course, scanner 106 need not include a processor or controller at all, as scanner 106 may be configured to be controlled by an external processor or controller. Of course, scanner 106 may be controlled in any suitable manner, depending on the application.

Figure 2B:
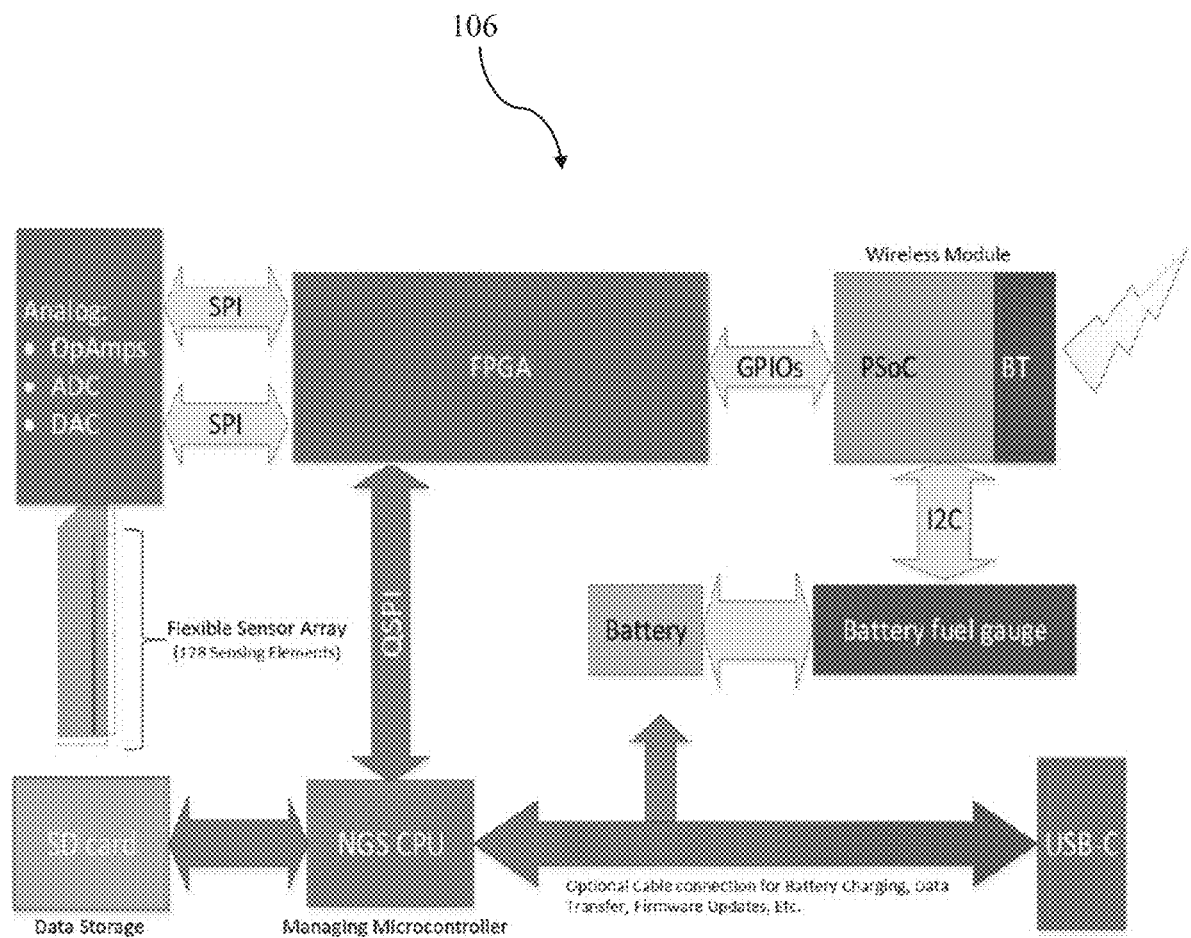
FIG. 2B is a schematic showing the flow of data of the portable tire contact measurement system according to another illustrative embodiment.

FIG. 2B is a flowchart depicting an exemplary flow of data within scanner 106 of portable tire contact measurement device 100 according to another embodiment. In the illustrated embodiment, the scanner may collect data from the array of sensors using one or more of an OpAmp (operational amplifier), a DAC (digital to analog converter), and an ADC (analog to digital converter). The data may then travel to an FPGA (field programmable gate array) via one or more SPI's (serial peripheral interfaces). In order to achieve the desired polling rates (e.g., 20,000 Hz) the FPGA may be used to manage the data collection from the array of sensors while a separate CPU, such as an NGS CPU (next generation sequencing central processing unit) is used to manage the storage of the data onto a suitable memory device, such as a removable micro-SD card. While the diagram in FIG. 2B shows a Bluetooth based wireless module (used to enable the system for high-speed data collection or to transfer data after a recording has been made), it should be understood that any type of wireless data transfer method (Wi-Fi, magnetic induction, etc.) could be used, depending on the application.

Particularly, the FPGA in the illustrated embodiment is connected to a PSoC (programmable system on a chip) via one or more GPIO's (general purpose input output). Moreover, the PSoC is equipped with a Bluetooth module to wirelessly transmit data or receive commands from an external device. In turn the PSoC is connected to a battery fuel gauge and battery via a 12C bus, though other manners of electrically connecting the PSoC to the battery and/or battery fuel gauge may be employed, depending on the application.

Additionally, in the illustrated embodiment, the data transfer is performed using a USB cable, though other suitable cables may be employed, depending on the application.

Figure 3:
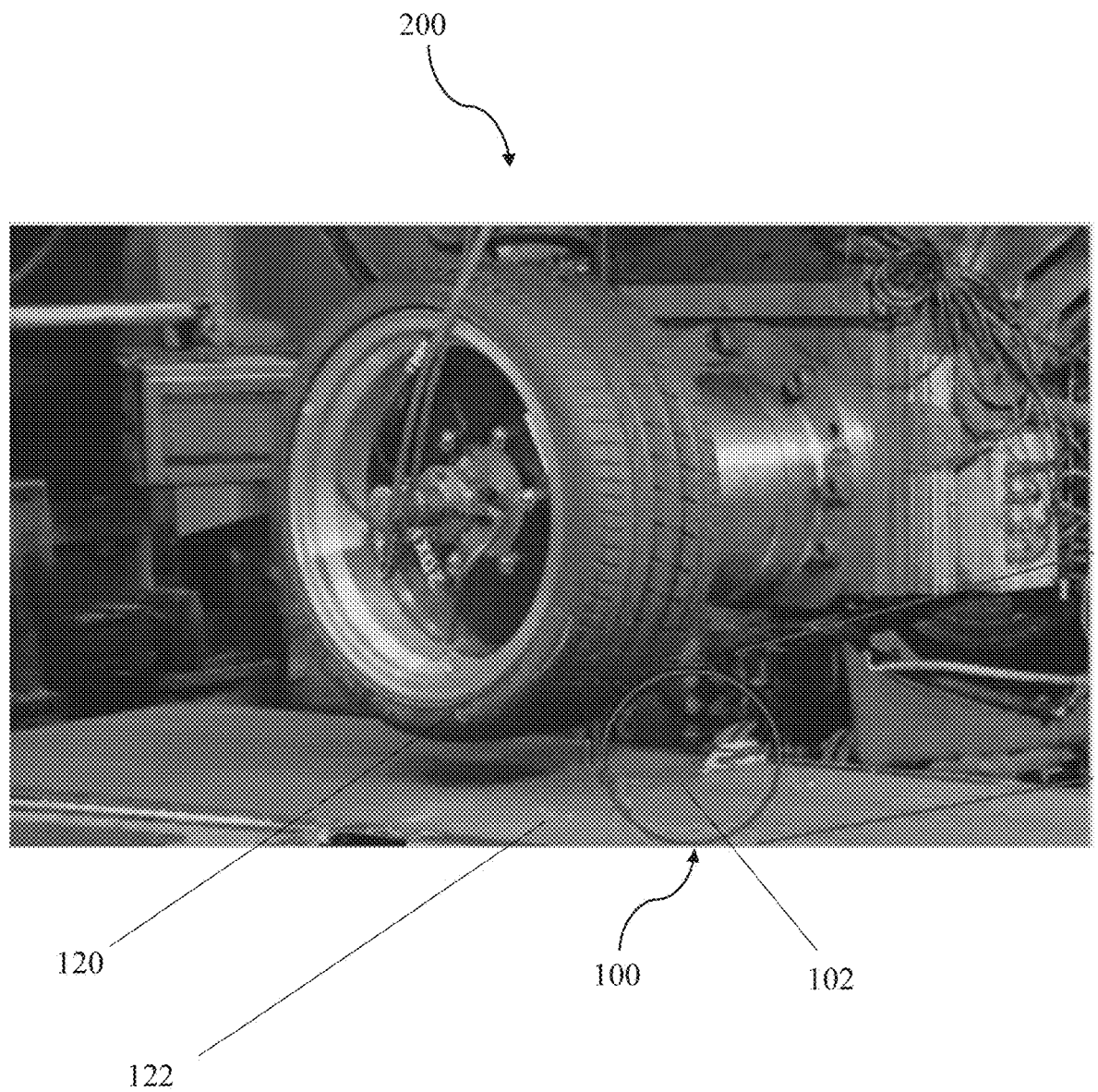
FIG. 3 is a perspective view of a portable tire contact measurement system attached to a tire contact patch testing rig according to one illustrative embodiment.

FIG. 3 shows an exemplary belt type test rig to which portable tire contact measurement device 100 is attached. In the illustrated embodiment, tire contact measurement device 100 is fixed to a belt 122 using hook and loop fasteners, though tire contact measurement device 100 may be fixed to belt 122 using any appropriate means (e.g., an adhesive as described above). Tire contact measurement device 100 is positioned on belt 122 such that array of sensors 102 aligns with the patch of a tire 120, while the remainder of portable tire contact measurement device 100 (e.g., scanner 106), remains out of the path of tire 120. As tire 120 makes contact with and moves on belt 122, array of sensors 102 begin to measure one or more parameters (e.g., size, shape, vertical pressure profile, etc.) of the contact patch between tire 120 and belt 122, and those measurement may be stored as data, for example, by using the methods and systems described above. Once the tests are complete, portable tire contact measurement device 100 may be removed from belt 122 to be used under different testing conditions if needed.

Portable tire contact measurement device 100 may be capable of being fixed to and measuring one or more parameters of the contact patch between a tire and any number of suitable surfaces. For example, in addition to functioning on a belt type test rig as illustrated in FIG. 3, portable tire contact measurement device 100 may also be capable of being fixed to and measuring one or more parameters of the contact patch between a tire and a drum type test rig, a road, or any other suitable test condition.

Figure 4:
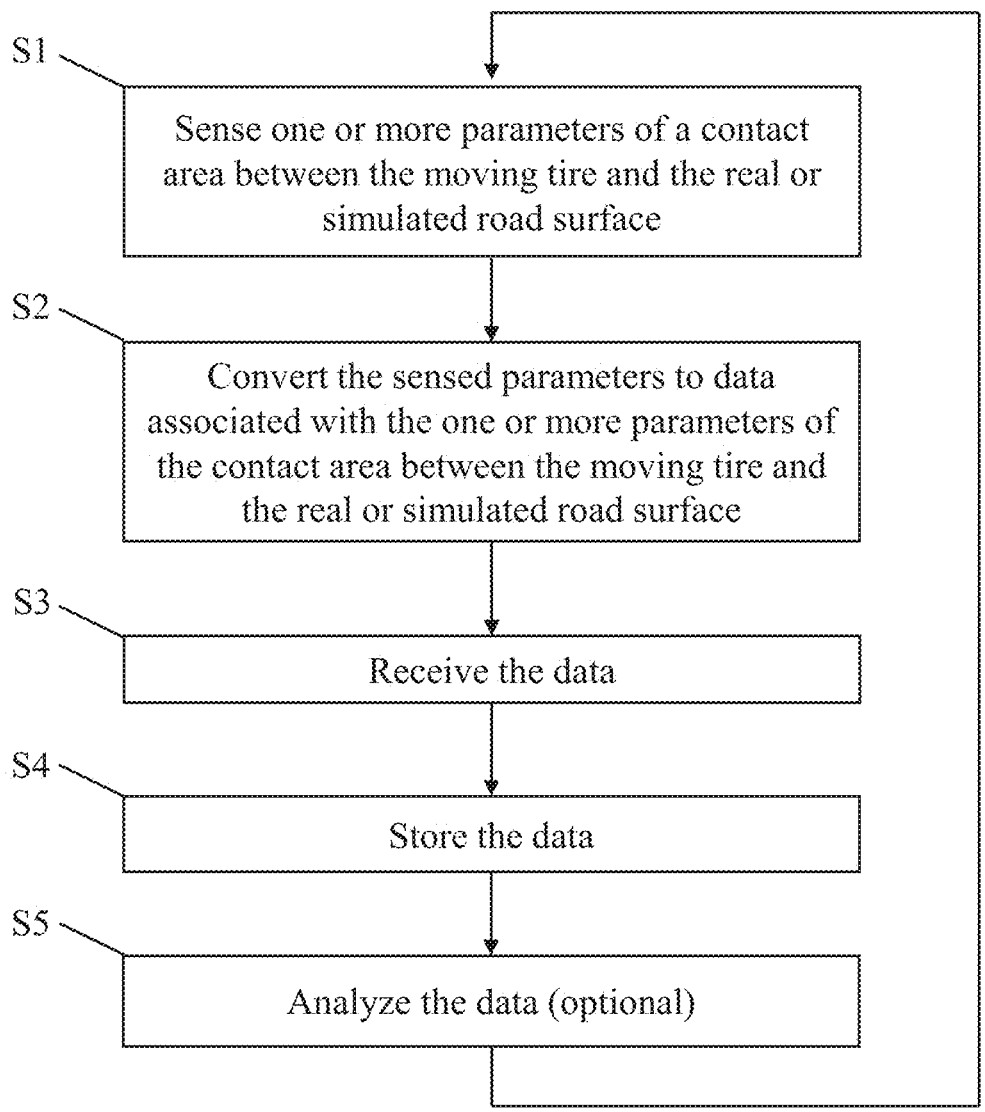
FIG. 4 is a flowchart showing a method of collecting and processing tire contact patch data according to one illustrative embodiment.

FIG. 4 is a flowchart detailing an exemplary method of using portable tire contact measurement device 100 to collect and store data associated with one or more parameters of a contact patch. Particularly, to begin collecting data a user may trigger array of sensors 102 of portable tire contact measurement device 100 to begin collecting data, thus initiating step S1, where one or more parameters of the contact patch are sensed (e.g., measured), by the array of sensors. Then at step S2, the measurements from the array of sensors are converted to data, for example by the scanner. The internal electronics of the scanner, such as the recording electronics may then receive the data at step S3 before storing the data, for example in a memory, at step S4. At step S5, the data may be optionally analyzed, either on board the scanner or externally depending on the application.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. Though, a processor may be implemented using circuitry in any suitable format.

Also, the processor may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A lightweight, portable system for measuring the size, shape and vertical pressure profile of a contact area occurring between a moving tire and a real or simulated road surface, the system comprising:
- a thin, flexible elongate array of force or pressure sensing elements mounted on a strip of material and configured to extend across a width of the tire to sense a contact patch;
- a means for scanning the array of sensing elements to determine a contact force or pressure on a surface of the array at a time;
- a means for storing data associated with the contact force or pressure on the surface of the array at the time;
- a means for collecting the stored data for analysis on an external computing device;
- a means for wirelessly transferring the stored data to the external computing device; and
- a means for removably attaching the strip to one of the moving tire and the real or simulated road surface.

2. The system of claim 1, wherein the means for removably attaching the strip to the real or simulated road surface is configured to mount the strip to a movable drum test system or belt test system.

3. The system of claim 1, wherein the means for removably attaching the strip to the real or simulated road surface is configured to mount the strip onto a road or track surface.

4. The system of claim 1, wherein the array of force or pressure sensing elements includes one or more piezo-resistive or capacitive sensors.

5. The system of claim 1, wherein the means for scanning the array, the means for storing data, the means for collecting the stored data, and the means for wirelessly transferring the stored data to the external computing device are housed within a housing; wherein the strip is configured to be separable from the housing system.

6. The system of claim 5, wherein the means for collecting the stored data is configured to be selectively removable from the housing.

7. The system of claim 1, wherein the system weighs less than or equal to approximately 500 grams and a top of the system is positioned at a height of less than or equal to 2.5 cm away from the real or simulated road surface, when mounted thereto.

8. A portable tire contact measurement device configured to process data associated with one or more parameters of a contact area between a moving tire and a real or simulated road surface comprising:
- a 1×N array of sensors arranged on a thin, flat, flexible strip of material and configured to be mounted to the real or simulated road surface, wherein N is an integer greater than 1 and wherein the array is configured to sense one or more parameters of the contact area between the moving tire and the real or simulated road surface; and
- a scanner supported by the strip of material, the scanner configured to receive and store the data associated with the one or more parameters of the contact area between the moving tire and the real or simulated road surface sensed by the array.

9. The device of claim 8, wherein the scanner is configured to communicate with a processor configured to analyze the data.

10. The device of claim 8, wherein the scanner includes a processor configured to analyze the data.

11. The device of claim 8, wherein the device weighs less than or equal to approximately 500 grams.

12. The device of claim 8, further comprising a housing mounted to the thin, flat, flexible strip of material, the housing configured to house the scanner, wherein a top of the housing is positioned at a height of less than or equal to 2.5 cm away from the real or simulated road surface, when mounted thereto.

13. The device of claim 8, wherein the device is configured to be mounted to a test system.

14. The device of claim 8, wherein the device is configured to be mounted an outer cylindrical surface of a rotatable drum of a test system.

15. The device of claim 8, wherein the device is configured to be mounted a surface of a movable metallic belt of a test system.

16. The device of claim 8, wherein the scanner is configured to poll the array at a polling rate of approximately 20,000 Hz.

17. The device of claim 8, in combination with an analysis device that is configured to analyze the data associated with the one or more parameters of the contact area between the moving tire and the real or simulated road surface, the analysis device further configured to generate a digital image of the contact area between the moving tire and the real or simulated road surface.

18. The device of claim 8, in combination with an analysis device that is configured to analyze the data associated with the one or more parameters of the contact area between the moving tire and the real or simulated road surface, wherein the processor is further configured to wirelessly communicate with the analysis device.

19. The device of claim 8, further comprising a housing mounted to the thin, flat, flexible strip of material and an analysis device housed in the housing, the analysis device is configured to analyze the data associated with the one or more parameters of the contact area between the moving tire and the real or simulated road surface.

20. The device of claim 8, wherein the device is configured to be mounted onto a surface of the tire.

21. The device of claim 8, wherein the array is configured to be embedded into the tire.

22. A force sensing array sensor for measuring a dynamic tire contact patch, the force sensing array sensor comprising:
- a thin and flexible strip configured to be mounted to a real or simulated flat road surface;
- a 1×128 array of piezo-resistive sensors mounted to the strip; and
- a housing mounted to the strip;
- scanning and recording electronics housed in the housing and communicating with the sensors;
- wherein the scanning electronics are configured to scan the sensors at a rate of approximately 20,000 Hz and wherein the recording electronics are configured to store data scanned by the scanning electronics.

23. The array sensor of claim 22, further including communication electronics configured to wirelessly communicate with an analysis device configured to analyze the stored data scanned by the scanning electronics.

24. The array sensor of claim 22, in combination with the analysis device, wherein the analysis device is configured to generate an image of the dynamic tire contact patch.

* * * * *